US006269103B1

(12) United States Patent
Laturell

(10) Patent No.: US 6,269,103 B1
(45) Date of Patent: *Jul. 31, 2001

(54) HIGH SPEED DATA INTERFACE USING TDM SERIAL BUS

(75) Inventor: Donald Raymond Laturell, Upper Macungie, PA (US)

(73) Assignee: Agere Systems Guardian Corp., Orlando, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,559

(22) Filed: Oct. 6, 1997

(51) Int. Cl.$^7$ ........................................ H04J 3/00
(52) U.S. Cl. .......................... 370/458; 370/376; 708/251
(58) Field of Search ..................... 370/359, 376, 370/419, 463, 442, 458, 498, 294, 314; 379/399, 375; 708/251

(56) References Cited

U.S. PATENT DOCUMENTS

| | | | | |
|---|---|---|---|---|
| 5,450,530 | * | 9/1995 | Snyder et al. | 375/320 |
| 5,517,492 | * | 5/1996 | Spear | 370/280 |
| 5,572,524 | * | 11/1996 | Harada et al. | 370/468 |
| 5,577,044 | * | 11/1996 | Oxford | 370/522 |
| 5,592,165 | * | 1/1997 | Jackson et al. | 341/143 |
| 5,689,534 | * | 11/1997 | Anderson et al. | 375/364 |
| 5,719,859 | * | 2/1998 | Kobayashi et al. | 370/347 |
| 5,754,590 | * | 5/1998 | Bays et al. | 375/222 |
| 5,812,798 | * | 9/1998 | Moyer et al. | 710/127 |
| 5,825,814 | * | 10/1998 | Detwiter et al. | 375/219 |
| 5,875,354 | * | 2/1999 | Charlton et al. | 710/61 |
| 5,881,317 | * | 3/1999 | Hampsten et al. | 710/62 |
| 5,889,856 | * | 3/1999 | O'Toole et al. | 379/399 |
| 5,928,342 | * | 7/1999 | Rossum et al. | 710/74 |
| 6,007,228 | * | 12/1999 | Agarwal et al. | 700/94 |

OTHER PUBLICATIONS

Analog Devices et al., "Audio Codec '97; Component Specification; Revision 1.03; Sep. 15, 1996".
Crystal Semiconductor Corporation, "CS4297 SoundFuson ™ Audio Codec '97", Apr. 1997.

* cited by examiner

Primary Examiner—Hassan Kizou
Assistant Examiner—Ahmed Elallam
(74) Attorney, Agent, or Firm—William H. Bollman

(57) ABSTRACT

A split-architecture audio codec providing an interface to a high speed broad band modem or other data source device capable of multi-megabit data rates. A plurality of time slots are utilized by the broad band modem in a time division multiplexed (TDM) data bus between the controller and analog sub-systems of the audio codec. Current examples of such high speed broad band modems include HDSL, SDSL, and ADSL, collectively referred to as xDSL. An interleaver in the analog sub-system rate adapts between the data rate of the broad band modem and the fixed rate of the TDM data bus between the sub-systems based on the number of time slots assigned to the broad band modem interface. Interface capability is provided for broad band modems having data rates up to 6.72 Mb/s for split-architecture audio codecs which conform to the AC '97 specification, and higher if non-conformance is acceptable. A programmable clock in the analog sub-system has the capability to operate in several modes including a conventional AC '97 conforming mode with the clock set to divide the frequency of the external crystal in half, and an AC '97 non-conforming mode wherein the frequency of an external crystal oscillator is multiplied by one or more to correspondingly increase the speed of the TDM data bus and the capacity of the interface to the broad band modem.

38 Claims, 5 Drawing Sheets

AC-LINK AUDIO OUTPUT FRAME

HIGH SPEED DATA INTERFACE USING TDM SERIAL BUS

BACKGROUND OF THE INVENTION

1. Field of the Invention

This invention relates to an interface for a Digital Subscriber Line. More particularly, it relates to an audio codec capable of interfacing to a multi-megabit per second high speed broad band modem or Digital Subscriber Line by utilizing multiple time slots of a high speed time domain multiplexed data bus.

2. Background of Related Art

Efficient and inexpensive digitization of telephone grade audio has been accomplished for many years by an integrated device known as a "codec." A codec (short for COder-DECoder) is an integrated circuit or other electronic device which combines the circuits needed to convert analog signals to and from digital signals, e.g., Pulse Code Modulation (PCM) digital signals.

Early codecs converted analog signals at an 8 KHz rate into 8-bit PCM for use in telephony, and were not capable of handling modem inputs. More recently, the efficiency and low cost advantages of codecs have been expanded to convert analog signals at a 48 KHz sampling rate into 16-bit stereo (and even up to 20-bit stereo) for higher quality use beyond that required for telephony. With higher quality and broader bandwidth capability, today's codecs find practical application with consumer equipment such as voice band modems.

With the development of codecs for these more sophisticated purposes came the need to improve the analog signal-to-noise (S/N) ratio to at least 75 to 90 dB. One major step toward achieving this high S/N ratio was accomplished more recently by separating the conventional codec into two individual sub-systems: a controller sub-system or integrated circuit (IC) handling primarily the digital interface to a host processor, and an analog sub-system or IC handling primarily the interface to, mixing and conversion of analog signals. This split digital/analog architecture has been documented most recently as the "Audio Codec '97 Component Specification", Revision 1.03, Sep. 15, 1996 ("the AC '97 Specification"). The AC '97 Specification in its entirety is expressly incorporated herein by reference.

The modem capability of today's audio codecs such as those defined by the AC '97 Specification is limited in bandwidth to support only modems in the voice band having a sampling rate not exceeding 48 KHz (48 Kilosamples per second Ks/s). However, there is a growing consumer need for audio codecs to handle high capacity modem data. The current audio codecs, particularly the two sub-system audio codec defined by the AC '97 Specification, provide only an interface to a lower speed voice band modem using a single 16-, 18- or 20-bit time slot in a TDM serial data stream, at a maximum sampling rate of 48 Ks/s. The AC '97 Specification does not provide the capability to handle multi-megabit per second modem data sources such as from a high speed wide band modem.

FIG. 5 shows a conventional split-architecture audio codec interfacing to a low speed voice band modem 510 such as that defined by the AC '97 Specification. An AC controller sub-system 500 interfaces to an AC analog sub-system 502 via a five-wire time division multiplexed (TDM) bus referred to as the AC link 504. The five-wire TDM bus of the AC link 504 comprises a sync signal 512, a reset signal 520, a serial TDM data stream SDATA_OUT 516 from the AC controller sub-system 500 to the AC analog sub-system 502, a bit clock signal BIT_CLK 514, and a serial TDM data stream SDATA_IN 518 from the AC analog sub-system 502 to the AC controller 500. The bit clock signal BIT_CLK 514 is derived by a clock 506 utilizing an external crystal 508. The frequency of the external crystal 508 is divided in half by the clock 506 to provide a bit clock signal BIT_CLK 514 which is half of the frequency of the external crystal 508.

The AC analog sub-system 502 includes a single bi-directional modem interface capable of handling a low speed voice band modem 510 at a 16-, 18- or 20-bit per sample, 48 Ks/s maximum rate. This translates to a maximum 0.96 Mb/s conversion data rate of analog-to-digital converter (ADC) 522 and digital-to-analog converter (DAC) 524. There is no provision in the conventional split-architecture audio codec for handling a high speed broad band modem or any device having a sampling rate higher than 48 K/s or a data rate exceeding that of a voice band modem.

The circuitry in the conventional AC analog sub-system 502 which interfaces to the low-speed voice band modem includes ADC 522 and DAC 524. ADC 522 samples the analog modem signal input to the AC analog sub-system 502 and provides 16-, 18-, or 20-bit data at 48 K/s to the AC link 504 for insertion into time slot 5 of the serial TDM data stream SDATA_IN 518 input to the AC controller sub-system 500. Conversely, DAC 524 receives 16-, 18-, or 20-bit data from the serial TDM data stream SDATA_OUT 516 from the AC controller sub-system 500 of the AC link 504 and converts the same into an analog signal output to the low-speed voice band modem 510. Conventional demodulation and modulation techniques such as quadrature amplitude modulation (QAM) or Carrierless Amplitude and Phase (CAP) may be performed by a digital signal processor (DSP) and/or other processor in conjunction with the ADC 522 and DAC 524.

FIG. 6 depicts a conventional sync signal 512, serial TDM data stream SDATA_OUT 516, and serial TDM data stream SDATA_IN 518, in a twelve slot TDM bi-directional data stream between the analog and controller sub-systems 502, 500 of a split-architecture audio codec such as in accordance with the AC '97 Specification. The twelve time slots 1 to 12 of the serial TDM data streams SDATA_OUT 516 and SDATA_IN 518 are framed by a sync signal 512. The sync signal 512 is derived from a TAG Phase 600 during time slot 0. All time slots are 20 bits wide.

Time slots 1 and 2 of the serial TDM data stream SDATA_OUT 516 from the AC controller sub-system 500 to the AC analog sub-system 502 comprise command addresses 601 and command data 602. Status addresses 621 and status data 622 are passed in time slots 1 and 2 of the serial TDM data stream SDATA_IN 518 from the AC analog sub-system 502 to the AC controller sub-system 500. Time slots 3 and 4 of the serial TDM data stream SDATA_OUT 516 and serial TDM data stream SDATA_IN 518 comprise the stereo pulse code modulated (PCM) audio data between the AC analog sub-system 502 and the AC controller sub-system 500.

Time slot 5 of the serial TDM data stream SDATA_IN and SDATA_OUT 518, 516 contains the data from and to the low speed voice band modem 510 (FIG. 5). Time slot 6 of the serial TDM data stream SDATA_IN 518 contains microphone PCM data. The remaining time slots 7 through 12 of both the serial TDM data stream SDATA_IN and SDATA_OUT 518, 516 and time slot 6 of the serial TDM data stream SDATA_OUT 516 are unused in the conventional split-architecture audio codec.

FIG. 7 depicts in more detail the bit clock signal BIT_CLK 514 and serial TDM data stream SDATA_OUT 516 with reference to the sync signal 512. The conventional bit clock signal BIT_CLK 514 is a fixed 12.288 MHz clock signal derived in the clock 506 from the external 24.576 MHz crystal oscillator 508 (FIG. 5).

Thus, conventional split-architecture audio codecs provide limited capacity to handle high data rate modems.

SUMMARY OF THE INVENTION

The present invention provides an audio codec comprising a controller sub-system and an analog sub-system. The time division multiplexed serial data bus between the two sub-systems, known as the AC link in prior art systems, is expanded by the present invention to utilize more than one time slot to carry data to and from an interface to an analog source, e.g., a broad band modem. The digital-to-analog converter and analog-to-digital converter in the analog sub-system convert between the analog signal of the analog source and a plurality of time slots used in the TDM serial data bus.

An interleaver in the analog sub-system interleaves and passes data between the different word widths and different sampling speeds of (1) the plurality of utilized time slots of the TDM serial data bus; and (2) the converted data from the analog source.

In another embodiment, the clock in the analog sub-system of a split-architecture audio codec comprises a programmable divider or other multiplier to effectively multiply the oscillator frequency of an external crystal by any one of a plurality of predetermined values, and output the same as a bit clock signal.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
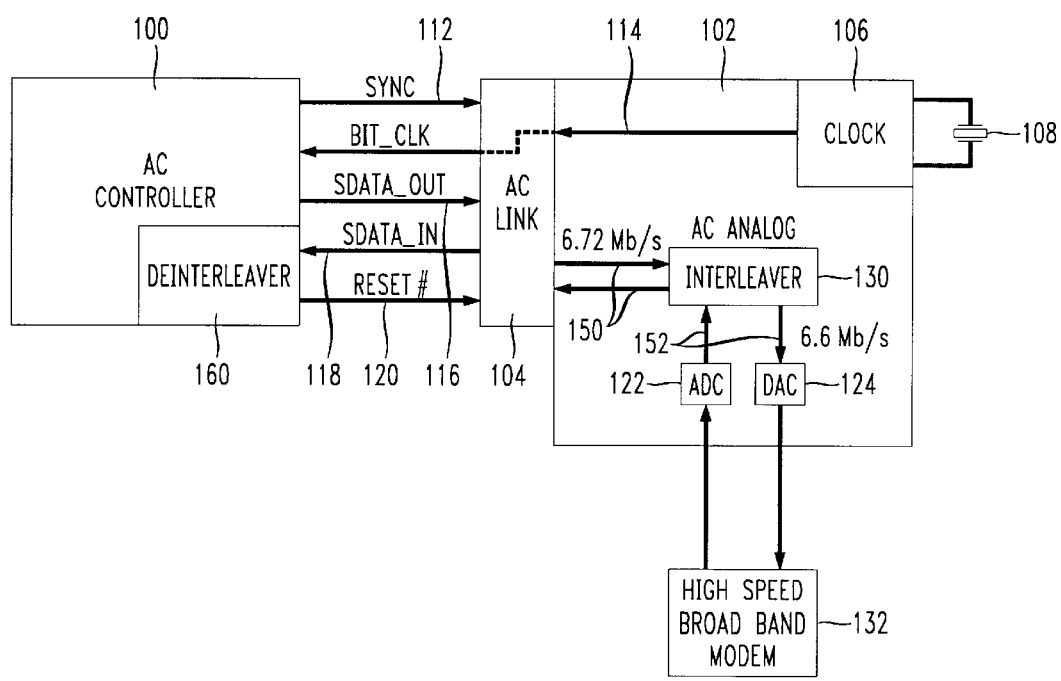
FIG. 1 shows a split-architecture audio codec including an interleaver which interfaces to a high speed broad band modem according to the present invention.

FIG. 1 shows a split-architecture audio codec according to a first embodiment of the present invention.

An AC controller sub-system 100 communicates with an AC analog sub-system 102 through an AC link 104. A five-wire TDM serial data bus separates the AC controller sub-system 100 from the AC link 104 of the AC analog sub-system 102. Although the present invention is not limited to a TDM serial data bus having five wires only, it is the presently preferred embodiment for maximum conformity with the current AC '97 standard. It is recognized and appreciated that the standard may and will change over time, and may even be disbanded. For instance, an extension to the AC '97 standard is anticipated and expected to be released in the future. Thus, although the disclosed embodiment is described with respect to the AC '97 standard, it is not so limited.

The split-architecture audio codec of the present invention provides an interface to a high speed, broad band modem 132 capable of data rates in excess of 1 Mb/s. Examples of such a broad band modem 132 include High data rate Digital Subscriber Line (HDSL), Symmetric DSL (SDSL), and Asymmetric DSL (ADSL), which are collectively and generically referred to as "xDSL". HDSL and SDSL typically operate at T1 rates (1.544 Mb/s) or E1 rates (2.048 Mb/s). ADSL typically operates at 1.5 to 9 Mb/s in a downstream direction. Of course, the present invention is applicable with any type of broad band modem, not just those in the xDSL family of research.

The interface of the AC analog sub-system 102 to the high speed broad band modem 132 includes an ADC 122 and a DAC 124 both suitably fast and accurate to convert the analog signal from the high speed broad band modem 132 to and from a digital data stream.

The current AC '97 standard limits each 48 KHz frame to containing a single 20-bit wide sample within the boundaries of a single time slot. The present embodiment loosens the restriction of the barriers of a single 20-bit wide time slot by allowing efficient placement of a plurality of shorter or longer samples within each 48 KHz frame. For instance, because the present embodiment provides up to 7×20 bits=140 bits per 48 KHz sample, more than twelve 11-bit samples can be handled in each 48 KHz frame. Thus, the present invention provides a greater flexibility in the prevention of aliasing.

Figure 5:
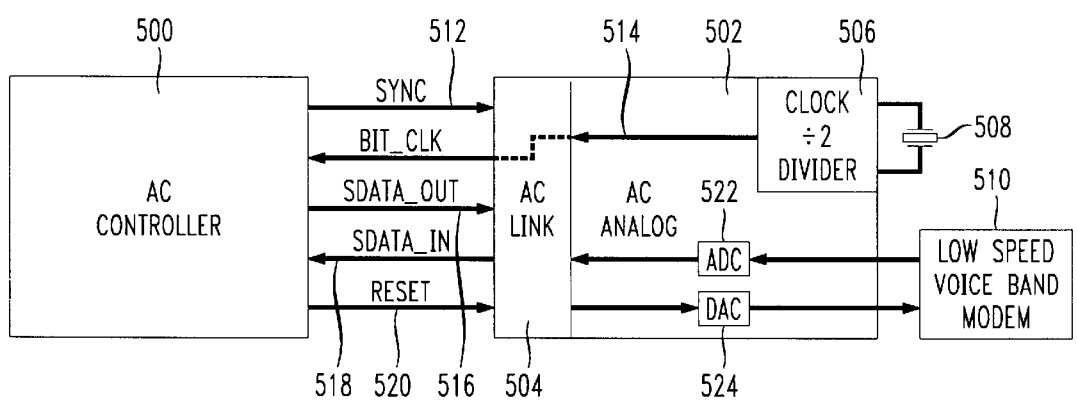
FIG. 5 shows a conventional split-architecture audio codec such as that defined by the AC '97 Specification interfacing to a low speed voice band modem.
Figure 6:
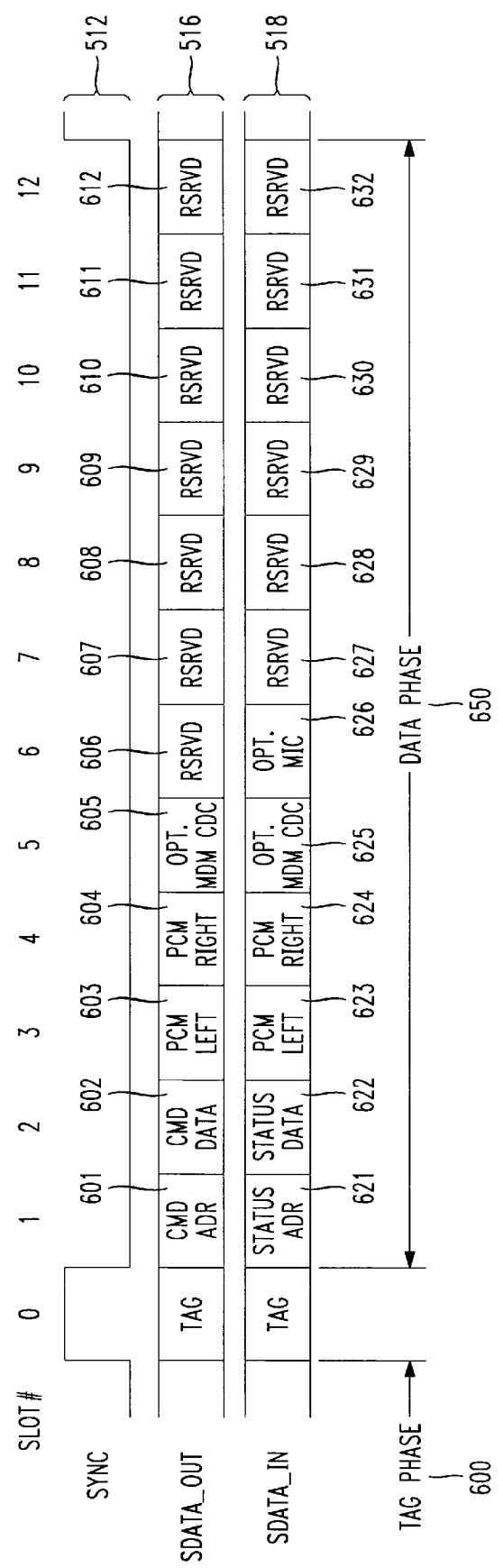
FIG. 6 depicts the time slots of a conventional split-architecture audio codec bidirectional TDM audio frame such as that of the AC link of the AC '97 Specification.
Figure 7:
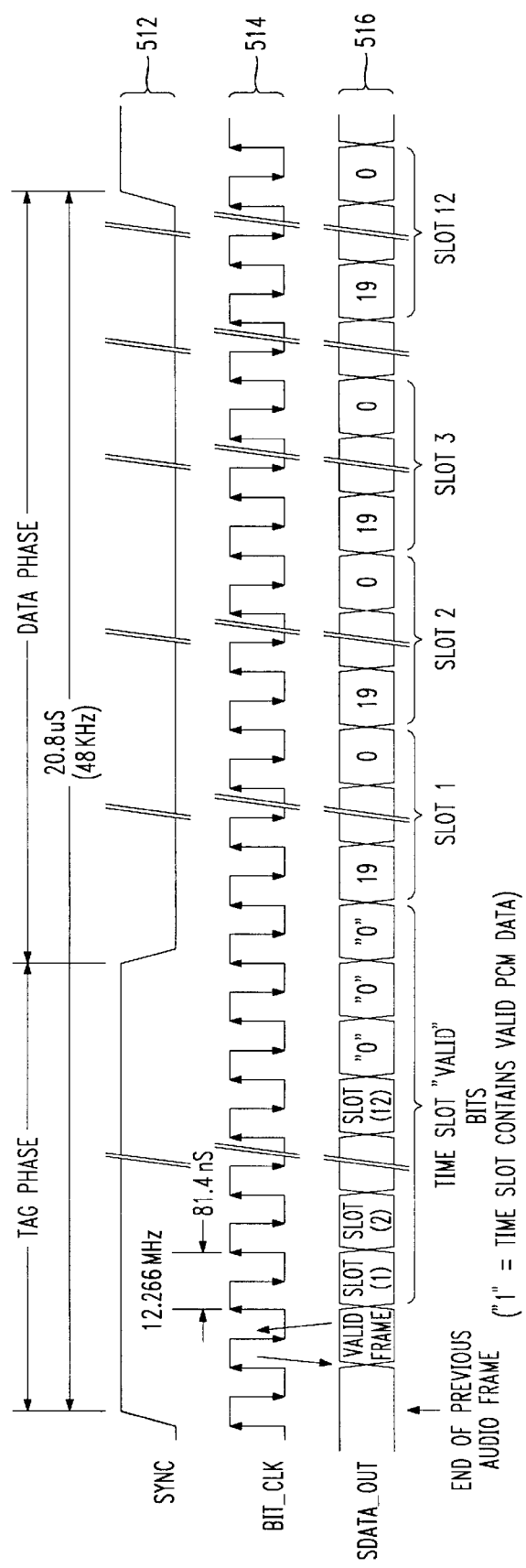
FIG. 7 depicts the bits of an audio output frame of a conventional split-architecture audio codec such as that of the AC link of the AC '97 Specification.

Based on the present invention, the data rate of the serial TDM data stream input and output from an interleaver 130 to the AC link 104 can be as fast as 6.72 Mb/s using seven time slots of the AC link 104 as in the present embodiment of the invention. The data rate is limited only by the number of TDM slots utilized in the five-wire TDM serial data bus 112–120 of the AC link 104. The seven time slots of the TDM serial data bus 112–120 used by the present embodiment are not used by the conventional AC link 504 (FIG. 5) and thus the present embodiment remains in conformance with the AC '97 Specification. Each of these seven time slots is structured as a 20-bit TDM time slot and has a frame or sampling frequency of 48 KHz.

Additional time slots of the AC link 104 may be utilized in some circumstances by interleaver 130 to increase the data transfer rate between the AC controller sub-system 100 and the AC analog sub-system 102, but at the sacrifice of some compatibility with the AC '97 specification and subsequent versions of the same. Additionally, the AC link 104 may be expanded to include additional serial TDM data streams to provide additional capacity. Table I shows the conversion data rates of a split-architecture audio codec based on the number of time slots utilized and the following formula:

\#timeslotsused×(20bits/timeslot)×48KHz= ConversionDataRate

TABLE I

| TIME SLOTS USED | CONVERSION DATA RATE |
| --- | --- |
| 1 time slot | 0.96 Mb/s |
| 2 time slots | 1.92 Mb/s |
| 3 time slots | 2.88 Mb/s |
| 4 time slots | 3.84 Mb/s |
| 5 time slots | 4.80 Mb/s |
| 6 time slots | 5.76 Mb/s |
| 7 time slots | 6.72 Mb/s |

Figure 2:
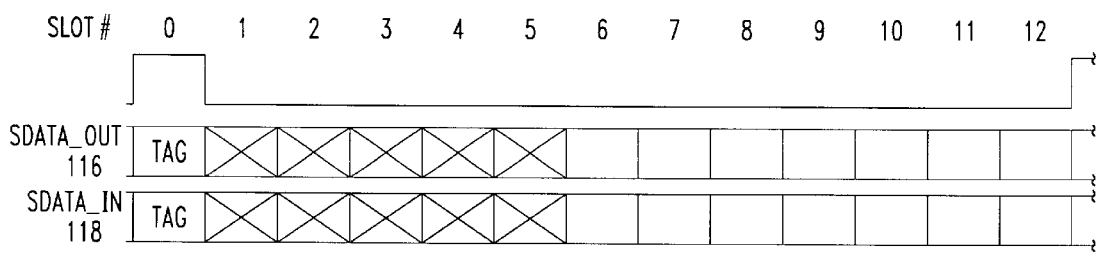
FIG. 2 depicts a bi-directional audio frame between analog and digital sub-systems of an audio codec according to an embodiment of the present invention.

FIG. 2 depicts in more detail the seven utilized time slots in the serial TDM data streams SDATA_OUT 116 and SDATA_IN 118 of the AC link 104 (FIG. 1). The particular time slots used in the particular split-architecture audio codec may be different from those of the present embodiment. Those of ordinary skill in the art will easily recognize that the present invention is fully applicable to any split-architecture audio codec which utilizes more than one 16-, 18-, or 20-bit time slot to pass high speed broad band modem data between sub-systems.

Because the data rate of high speed broad band modems in general is not in conformance with the exact data rates of the TDM serial data bus 112–120 of the conventional AC link 504 (FIG. 5), and because the sample width of ADC 122 and DAC 124 is not necessarily the same as the width of an individual time slot, an interleaving or rate adaption function must be performed between ADC and DAC 122, 124 and the AC link 104 of the AC analog sub-system 102. This interleaving function is performed in the disclosed embodiment by an interleaver 130.

In the direction from the high speed broad band modem 132 to the AC link 104, interleaver 130 receives data samples from the ADC 122 on a continuous basis and at a data rate and sample size suitable for the high speed broad band modem 132. For instance, in the disclosed embodiment of a 6.6. Mb/s high speed broad band modem 132 the received data samples are 11-bits each. When utilizing seven time slots of the serial TDM data bus of the AC link 104, interleaver 130 rate adapts between the continuous, 6.6 Mb/s, 11-bit samples of the data stream from the ADC 122, and the seven intermittent, 6.72 Mb/s, 20-bit time slots of the data stream of the AC link 104. In the disclosed embodiment, the 11-bit converted data samples from ADC 122 are re-packaged by the interleaver 130 into 20-bit samples for placement in seven time slots of the serial TDM data stream of the AC link 104. Thus, all 11 bits of an 11-bit first sample and the first 9 (e.g., the highest significant) bits of a second 11-bit sample would be placed in a first one of seven 20-bit time slots (e.g., time slot 6) of the AC link 104. Similarly, the last two (e.g., the least two significant) bits of the second 11-bit sample, all 11-bits of a third 11-bit data sample, and the first 7 bits of a fourth 11-bit data sample would be placed for passage in the second of the seven utilized time slots, e.g., time slot 7, of the serial TDM data bus of the AC. link 104, and so on.

The interleaver 130 is bi-directional. Thus, it also receives 20-bit data samples from each of the seven time slots in the serial TDM data bus of the AC link 104, and parses the same into 11-bit samples for conversion by the DAC 124.

Accordingly, at the example high speed broad band modem 132 data rate of 6.6 Mb/s, and utilizing seven time slots of the AC link 104, the interleaver 130 adapts data during each 48 KHz frame of the AC link 104 between data in seven utilized time slots of the AC link 104 and approximately 12.73 converted 11-bit samples of the ADC 122 and DAC 124 as follows.

$$\frac{7 timeslots \times 20 bits/timeslot}{11 bits/sample} = 12.73 samples/frame$$

(12.73samples/frame)×(48,000frames/sec)=610,909samples/sec

The interleaver 130 outputs data each frame so that no more than one frame delay, i.e., approximately 20.8 microseconds, is incurred by the interleaving function. Buffering of significantly more data is possible but is less desirable in the interleaver 130 because it would create substantial latency in the serial TDM data stream.

The interleaver 130 may be implemented by a first-in, first-out type (FIFO) memory and FIFO controller, or other data storage circuit. By interleaving the data stream from the high speed broad band modem 132 into a plurality of time slots of a TDM data stream, the interleaver 130 adjusts between the fixed data rate of the five-wire TDM serial data bus of the AC link 104 and the actual conversion data rate of the ADC 122 and DAC 124.

Figure 3A:
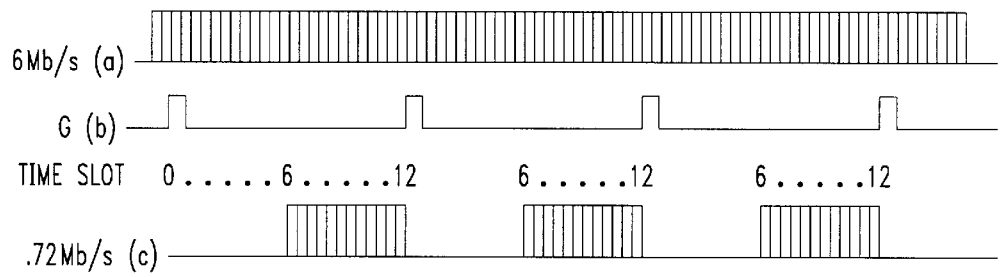
FIG. 3A depicts the result of the interleaving of the data from a high speed digital subscriber line and a fixed rate data stream formed by a plurality of time slots of a TDM bus.

FIG. 3A depicts the resultant interleaved output of interleaver 130. Waveform (a) in FIG. 3A depicts a continuous 6.6 Mb/s digital data stream from the high speed broad band modem 132 (shown in FIG. 1). Waveform (b) in FIG. 3A depicts the TAG phase representing time slot 0 of the AC link 104 when the SYNC signal 112 is high. Waveform (c) in FIG. 3A depicts the rate-adapted, interleaved output from interleaver 130 placed in 6.72 Mb/s data stream formed by seven time slots of the serial TDM data streams SDATA_OUT and SDATA_IN signals 116, 118.

Figure 3B:
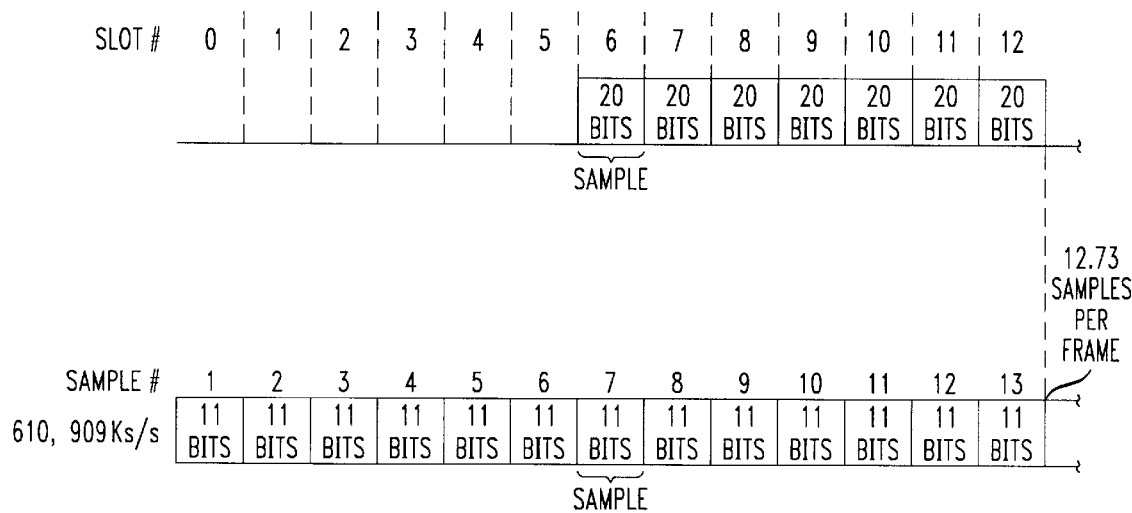
FIG. 3B is a detailed depiction of the interleaving between seven 20-bit time slots and 12.73 11-bit samples in a 48 KHz frame of data.

FIG. 3B is a more detailed depiction of the interleaving between the seven time slots of the serial TDM data streams SDATA_OUT and SDATA_IN of the AC link 104, and the continuous data stream of the high speed broad band modem 132.

Figure 4:
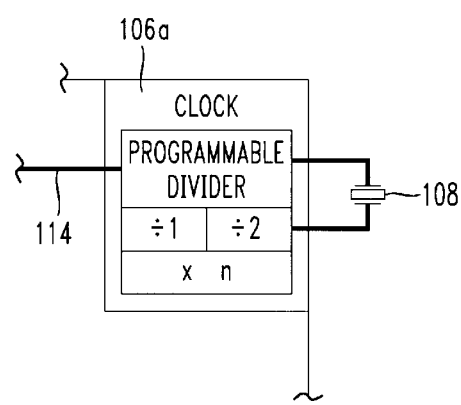
FIG. 4 shows a programmable clock in the AC analog sub-system of a split-architecture audio codec according to the present invention.

The clock 106 in the first embodiment of the present invention is the same as that in the prior art, i.e., as is described in the AC '97 Specification. FIG. 4 shows a second embodiment of the present invention wherein a programmable clock 106a replaces clock 106 shown in FIG. 1 and is otherwise as shown and described with reference to FIG. 1. The conventional clock 106 of a split-architecture audio codec multiplies the frequency of an external crystal oscillator 108 to obtain a bit clock signal BIT_CLK 114 (FIG. 5) of the desired frequency, preferably an integer multiple of the 12.288 MHz defined in the AC '97 Specification. The present invention provides programmability in the clock 106 with respect to the division of the frequency of the external crystal oscillator 108. In the present embodiment, the programmable clock 106a is set by a control register in the AC analog sub-system 102 to multiply the frequency of the external crystal oscillator 108. The frequency of the external oscillator 108 is either divided by two (as in the prior art) or by one (i.e., no division). A division by one effectively doubles the rate of the bit clock signal BIT_CLK 114. Moreover, a voltage controlled oscillator (VCO) with a phase-locked loop (PLL) can be implemented to multiply the frequency of the external crystal oscillator by an integer value of more than one.

The split-architecture audio codec including a programmable clock 106a according to the present embodiment allows for the implementation of three general modes of operation: (1) conventional AC '97 (or compatible) operation; (2) high speed broad band modem interface mode; and (3) multiple high speed broad band modem interface mode.

(1) conventional AC '97 (or compatible) operation

With programmable clock 106a set or programmed to multiply the frequency of the external crystal oscillator 108 (FIG. 1) by one-half to form the bit clock signal BIT_CLK 114, the split-architecture audio codec operates as specified in the AC '97 specification without interfacing to a high speed broad band modem 132.

(2) high speed broad band modem interface mode

With programmable clock 106a set to multiply the frequency of the external crystal 108 by one-half to form the bit clock signal BIT_CLK 114, and with the AC analog sub-system 102 interfaced to a high speed broad band modem 132, the split-architecture audio codec operates as described with respect to the first embodiment with time slots which sample at 48 K/s.

(3) multiple high speed broad band modem interface mode

With programmable clock 106a set to multiply the frequency of the external crystal 108 by one or more than one, and with the AC analog sub-system 102 interfaced to a high speed broad band modem 132, the split-architecture audio codec samples at 96 Ks/s, 192 Ks/s, etc., thus doubling, quadrupling, etc the data rates over the five-wire TDM data bus (AC link 104)(FIG. 1).

This mode of operation is particularly useful when the required data rate of the high speed broad band modem 132 exceeds that provided by the available TDM time slots of the AC link 104. For instance, seven time slots of the TDM serial streams in the AC link 104 can provide up to 1.2 Ms/s sampling with the clock doubled (clock 106a programmed to divide by one), as shown in the following Table II. Data rates through the high speed broad band modem 132 are thus doubled over the first embodiment to provide up to 13.44 Mb/s using seven time slots of the AC link 104.

TABLE II

| DOUBLED-CLOCK TIME SLOTS USED | CONVERSION DATA RATE |
| --- | --- |
| 1 time slot | 1.92 Mb/s (1,200 Ks/s) |
| 2 time slots | 3.84 Mb/s (2,400 Ks/s) |
| 3 time slots | 5.76 Mb/s (3,600 Ks/s) |
| 4 time slots | 7.68 Mb/s (4,800 Ks/s) |
| 5 time slots | 9.60 Mb/s (6,000 Ks/s) |
| 6 time slots | 11.52 Mb/s (7,200 Ks/s) |
| 7 time slots | 13.44 Mb/s (8,400 Ks/s) |

While the invention has been described with reference to the exemplary preferred embodiments thereof, those skilled in the art will be able to make various modifications to the described embodiments of the invention without departing from the true spirit and scope of the invention.

I claim:

1. An analog sub-system of a split-architecture audio codec comprising:

a serial data bus;

a digital-to-analog converter, in said analog sub-system of a split-architecture audio codec, in communication with an analog source;

an analog-to-digital converter, in said analog sub-system of a split-architecture audio codec, in communication with said analog source; and an interleaver, in said analog sub-system of a split-architecture audio codec, in communication with said serial data bus to interleave a first data sample having a first size from said analog-to-digital converter into a second data sample having a second size, different from said first size, on said serial data bus.

2. The analog sub-system according to claim 1, wherein:

said serial data bus is a serial time division multiplexed data bus comprising a plurality of time slots; and said interleaver utilizes only a sub-plurality of said plurality of time slots.

3. The analog sub-system according to claim 2, wherein:

said sub-plurality of said plurality of time slots together form a channel having a first data rate.

4. The analog sub-system according to claim 1, wherein:

said analog source is a broad band modem.

5. The analog sub-system according to claim 4, wherein:

said broad band modem is an xDSL device.

6. The analog sub-system according to claim 4, wherein:

said broad band modem is capable of a data rate in excess of 6 Mb/s.

7. An analog sub-system of a split-architecture audio codec comprising:

a time division multiplexed serial data bus including a plurality of frames, each frame including a plurality of time slots;

a digital-to-analog converter, in said analog sub-system of a split-architecture audio codec, in communication with an analog source;

an analog-to-digital converter, in said analog sub-system of a split-architecture audio codec, in communication with said analog source; and said digital-to-analog converter receiving a data sample of a first size from each of at least two of said plurality of time slots of a respective frame over said time division multiplexed serial data bus; and said analog-to-digital converter converting a second data sample of a second size, different from said first size, for placement in at least two of another plurality of time slots of another respective frame over said time division multiplexed serial data bus.

8. The analog sub-system according to claim 7, further comprising:

an interleaver in communication with said time division multiplexed serial data bus to interleave said data having a first rate from said analog-to-digital converter into data having a second rate in said time division multiplexed serial data bus, said interleaver utilizing only a sub-plurality of said plurality of time slots.

9. The analog sub-system according to claim 8, wherein:

said sub-plurality of said plurality of time slots together form a channel having said second data rate.

10. The analog sub-system according to claim 8, wherein:

said analog source is a broad band modem.

11. The analog sub-system according to claim 10, wherein:

said broad band modem is an xDSL device.

12. The analog sub-system according to claim 10, wherein:

said broad band modem is capable of a data rate in excess of 6 Mb/s.

13. An audio codec comprising:

a serial data bus;

an interleaver, in said audio codec, in communication with said serial data bus;

an analog-to-digital converter, in said audio codec, in communication with said interleaver; and a digital-to-analog converter, in said audio codec, in communication with said interleaver;

said interleaver interleaving a first data stream having a first data sample size converted by said analog-to-digital converter into a second data stream having a second data sample size placed on said serial data bus first data sample size being different from second data sample sizes; and said interleaver interleaving a third data stream having a third data sample size from said serial data bus onto a fourth data stream having a fourth data sample size to said digital-to-analog converter.

14. The audio codec according to claim 13, wherein:

said serial data bus is a time division multiplexed data bus comprising a plurality of time slots; and said interleaver utilizes only a sub-plurality of said plurality of time slots.

15. The audio codec according to claim 14, wherein:

said sub-plurality of said plurality of time slots together form a data rate in excess of that of data from an analog data source.

16. The audio codec according to claim 13, wherein:

said analog data source is a broad band modem.

17. The audio codec according to claim 16, wherein:

said broad band modem is an xDSL device.

18. The audio codec according to claim 16, wherein:

said broad band modem is capable of a data rate in excess of 6 Mb/s.

19. An audio codec comprising:

a serial data bus;

an interleaver in communication with said serial data bus;

an analog-to-digital converter in communication with said interleaver; and a digital-to-analog converter in communication with said interleaver;

said interleaver interleaving a first data stream having a first data sample size converted by said analog-to-digital converter into a second data stream having a second data-sample size placed on said serial data bus first data sample size being different from second data sample size; and said interleaver interleaving a third data stream having a third data sample size from said serial data bus onto a fourth data stream having a fourth data sample size to said digital-to-analog converter;

wherein said interleaver interleaves at least twelve samples into each frame of said serial time division multiplexed data bus.

20. A clock in an analog sub-system of a split-architecture audio codec, said clock comprising:

an interface to an external crystal oscillator providing an oscillator frequency;

a control register in said analog sub-system to multiply said oscillator frequency by any one of a plurality of predetermined values; and a programmable divider to divide said oscillator frequency by any one of a plurality of other predetermined values;

one of said divided oscillator frequency and said multiplied oscillator frequency being selectably output as a bit clock signal;

21. The clock according to claim 20, wherein said plurality of other predetermined values comprise:

one; and two.

22. A method of interleaving data in an analog sub-system of a split architecture audio codec, comprising:

receiving data from an analog source into an analog-to-digital converter of said analog sub-system of a split architecture audio codec;

outputting digital data of a first sample size from said analog-to-digital converter; and interleaving said digital data at said first sample size into at least two time slots of a frame on a serial data bus, each time slot having a second sample size, different from said first sample size.

23. The method of interleaving data in an analog sub-system of a split architecture codec according to claim 22, wherein:

said serial data bus is a serial time division multiplexed data bus comprising a plurality of frames, each frame comprising a plurality of time slots; and said interleaving utilizes a sub-plurality of said plurality of time slots of said serial data bus.

24. The method of interleaving data in an analog sub-system of a split architecture codec according to claim 23, wherein:

said sub-plurality of time slots together from a channel having said second rate.

25. The method of interleaving data in an analog sub-system of a split architecture codec according to claim 22, wherein:

said analog source is a broad band modem.

26. The method of interleaving data in an analog sub-system of a split architecture codec according to claim 25, wherein:

said broad band modem is an xDSL device.

27. The method of interleaving data in an analog sub-system of a split architecture codec according to claim 25, wherein said broad band modem is capable of a data rate in excess of 6 Mb/s.

28. An analog sub-system of a split architecture audio codec, comprising:

means for interfacing an analog-to-digital converter and a digital-to-analog converter of said analog sub-system of a split architecture audio codec to an analog device;

means for inputting input data having a first sample size from said analog-to-digital converter to at least two of a plurality of time slots of a time-division multiplexed serial data bus, each time slot having a second sample size, different from said first sample size; and means for outputting output data having said first sample size from another at least two of another plurality of time slots of said time-division multiplexed serial data bus to said digital-to-analog converter, each time slot of said another plurality of time slots having said second sample size, different from said first sample size.

29. The analog sub-system according to claim 28, further comprising:

means for interleaving said input data having said first sample size from said analog-to-digital converter into data having said second sample size in said time division multiplexed serial data bus, said interleaving utilizing a sub-plurality of said plurality of time slots.

30. The analog sub-system according to claim 28, further comprising:

means for interleaving said output data having said second sample size from said time division multiplexed serial data bus into data having said first sample size in said digital-to-analog converter, said interleaving utilizing a sub-plurality of said plurality of time slots.

31. The analog sub-system according to claim 29, wherein:

said input data having said first sample size for a first data rate; and said sub-plurality of said plurality of time slots together form a channel having a faster second data rate.

32. The analog sub-system according to claim 30, wherein:

said input data having said first sample size for a first data rate; and said sub-plurality of said plurality of time slots together form a channel having a faster second data rate.

33. A method of interleaving data in an analog sub-system of a split architecture audio codec, comprising:

interleaving digital data in said analog sub-system of a split architecture audio codec of a first data sample size from at least two of a plurality of time slots of a serial data bus into digital data of a second data sample size, different from said first sample size, for a digital-to-analog converter;

converting said digital data of said second data sample size into analog data in said digital-to-analog converter; and outputting said analog data from said digital-to-analog converter to an analog device.

34. The method of interleaving data in an analog sub-system of a split architecture codec according to claim 33, wherein:

said serial data bus is a serial time division multiplexed data bus comprising a plurality of time slots, and said interleaving utilizes a sub-plurality of said plurality of time slots of said serial data bus.

35. The method of interleaving data in an analog sub-system of a split architecture codec according to claim 34, wherein:

said sub-plurality of time slots together form a channel having a first rate.

36. The method of interleaving data in an analog sub-system of a split architecture codec according to claim 33, wherein:

said analog device is a broad band modem.

37. The method of interleaving data in an analog sub-system of a split architecture codec according to claim 36, wherein:

said broad band modem is an xDSL device.

38. The method of interleaving data in an analog sub-system of a split architecture codec according to claim 36, wherein said broad band modem is capable of a data rate in excess of 6 Mb/s.

* * * * *